(12) United States Patent
Banh et al.

(10) Patent No.: US 7,787,897 B2
(45) Date of Patent: Aug. 31, 2010

(54) METHOD FOR UP-LINK TRANSMIT POWER MANAGEMENT IN A WIRELESS BROADBAND TERMINAL

(75) Inventors: An Tuyen Banh, Murphy, TX (US); Hang Jin, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1142 days.

(21) Appl. No.: 11/435,428

(22) Filed: May 16, 2006

(65) Prior Publication Data
US 2006/0270439 A1 Nov. 30, 2006

Related U.S. Application Data

(60) Provisional application No. 60/684,021, filed on May 23, 2005.

(51) Int. Cl.
*H04B 7/00* (2006.01)
(52) U.S. Cl. .................. 455/522; 455/63.1; 455/501; 455/452.2

(58) Field of Classification Search .......... 455/522, 455/69, 420, 450, 451, 452.1, 452.2, 464, 455/509, 67.1, 13.4, 561, 63.1, 453, 501, 455/405; 370/252, 333, 208; 375/260, 300
See application file for complete search history.

(56) References Cited

U.S. PATENT DOCUMENTS

| 5,870,393 | A | 2/1999 | Yano et al. ............. 370/335 |
| 6,445,930 | B1* | 9/2002 | Bartelme et al. ........ 455/522 |
| 2002/0186710 | A1 | 12/2002 | Alvesalo et al. ......... 370/468 |
| 2004/0162097 | A1* | 8/2004 | Vijayan et al. .......... 455/522 |
| 2004/0228283 | A1* | 11/2004 | Naguib et al. .......... 370/252 |
| 2005/0002324 | A1* | 1/2005 | Sutivong et al. ........ 370/208 |
| 2005/0043033 | A1 | 2/2005 | Fabien et al. .......... 455/452.1 |
| 2006/0121946 | A1* | 6/2006 | Walton et al. .......... 455/561 |
| 2007/0060190 | A1* | 3/2007 | Sanders et al. ......... 455/522 |

* cited by examiner

*Primary Examiner*—Tan Trinh

(57) ABSTRACT

A method is disclosed for optimizing up-link transmit powers of a wireless broadband terminal operating in a predetermined frequency band in a multi-carrier system, the method comprising assigning a transmit signal to one or more sub-carriers of predetermined frequencies, and capping the output powers of the transmit signal to a predetermined level based on the predetermined frequencies, wherein the output power of the transmit signal is lower if frequencies of the transmit signal have less guard band to the edge of the predetermined frequency band.

19 Claims, 3 Drawing Sheets

METHOD FOR UP-LINK TRANSMIT POWER MANAGEMENT IN A WIRELESS BROADBAND TERMINAL

CROSS REFERENCE

This application claims the benefits of U.S. Provisional Patent Application Ser. No. 60/684,021, which was filed on May 23, 2005 and entitled "Method for Optimizing Up-link Transmit Power for a Wireless Broadband Terminal in a Multi-Carrier System that Operating in the License Bands to Improve Capacity and Link Budget."

BACKGROUND

The present invention relates generally to wireless communication systems, and more particularly, to power management for multi-carrier wireless broadband terminals.

In a multi-carrier wireless communication system, a transmit signal has many sub-carriers or tones. Each sub-carrier or tone carries a pre-determined amount of information in a pre-defined bandwidth. For instance, in certain multi-carrier system, a downlink transmit signal from a base station (BTS) transmitter consists of ten 500 kHz sub-carriers to form a 5 MHz wide signals.

In licensed bands, such as MMDS band (2500-2686 MHz) and WCS band (2305-2360 MHz), in order to minimize interferences from one band to another, Federal emission rules limit the amount of out-of-band spurious emissions power radiated out of a transmitter. As a result, a transmitter output power is limited to a maximum allowable level that ensures the compliance to the regulatory rules.

The out-of-band emissions that are near the band edge are commonly caused by the intermodulation distortions from the transmitter. The out-of-band emissions that are far away from the band edge are commonly caused by the noise floor of the transmitter or the combination of the noise floor and intermodulation distortions of the transmitter.

Intermodulation distortion is nonlinear distortion characterized by the appearance, in the output of a device, of frequencies that are linear combinations of the fundamental frequencies and all harmonics present in the input signals.

In order to meet the FCC regulations, equipment providers commonly implement technologies as required, which are summarized below.

A first technology is a high power linear amplifier to minimize the intermodulation distortions. Its advantages are higher transmit power, better system link budget. Yet high power linear amplifier has disadvantages, such as high cost, high power consumption and large size (due to heat sink). Therefore, high power linear amplifier is suitable for the BTS implementation, and not for Customer-premises-equipment (CPE) terminals that prefer smaller size and lower cost.

A second technology is a channel filter to filter out the intermodulation distortions and to reduce the out-of-band noise floor. Its advantage is lower out-of-band spurious emissions. But its disadvantages are high cost due to added filter, lower transmitter power due to filter loss, fixed frequency channel and inability to reduce the out-of-band spurious emissions that are near the band edge. Therefore, channel filter is also suitable for the implementation on BTS and not for CPE terminals that require abilities to communicate with different BTS with different frequency channels.

A third technology is to provide extra guard band to a band edge, which allows higher transmit power, without implementing high cost liner amplifier. But its disadvantages are inefficient use of spectrum, reduced capacity and higher overall system cost.

Therefore, it is desirable to devise an improved method for use in a wireless broadband CPE terminal such as, PCMCIA cards, to meet the government emission rules, yet still maintains low cost, low power consumption and reasonable size.

SUMMARY

In view of the foregoing, a method is disclosed for optimizing up-link transmit powers of a wireless broadband terminal operating in a predetermined frequency band in a multi-carrier system, the method comprising assigning a transmit signal to one or more sub-carriers of predetermined frequencies, and capping the output powers of the transmit signal to a predetermined level based on the predetermined frequencies, wherein the output power of the transmit signal is lower if frequencies of the transmit signal have less guard band to the edge of the predetermined frequency band.

The construction and method of operation of the invention, however, together with additional objects and advantages thereof will be best understood from the following description of specific embodiments when read in connection with the accompanying drawings.

DESCRIPTION

The present disclosure provides a method for power management in a wireless broadband customer-premises-equipment (CPE) terminal of a multi-carrier system that operates in a licensed band to improve capacity and link budget.

Figure 1:
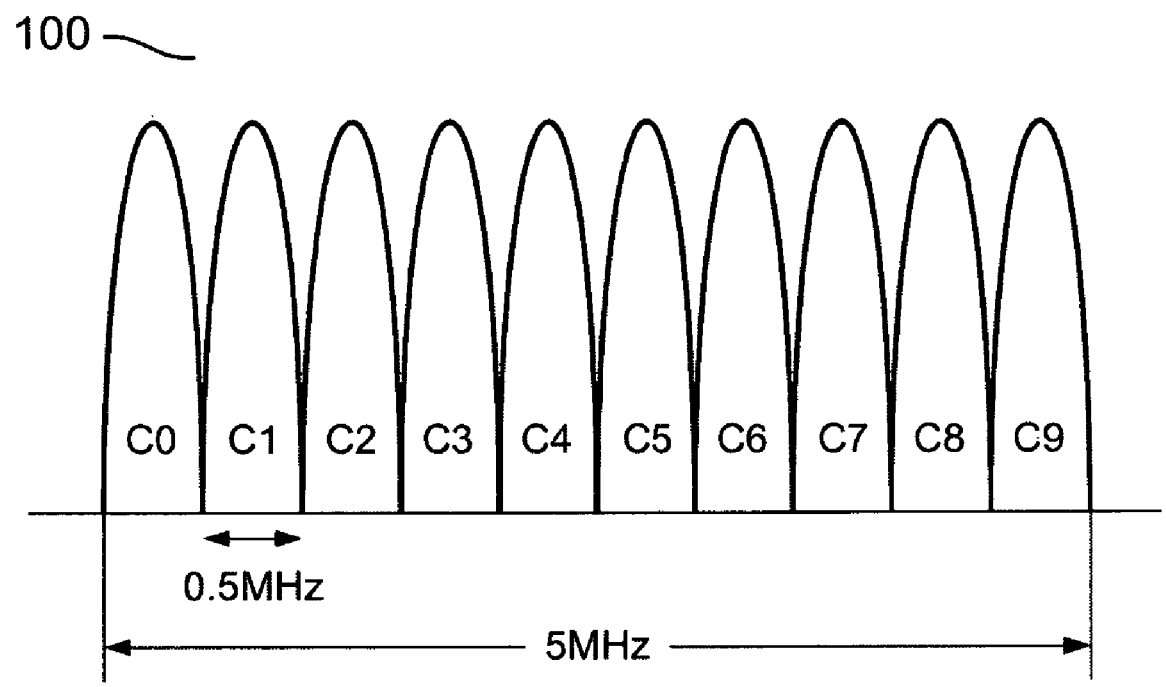
FIG. 1 illustrates a 10-carrier base station signal.

FIG. 1 illustrates a 10-carrier base station signal. A bandwidth for one sub-carrier is 500 kHz, then 10 sub-carriers form a bandwidth of 5 MHz. Each sub-carrier is used to carry a pre-determined amount of information.

Figure 2:
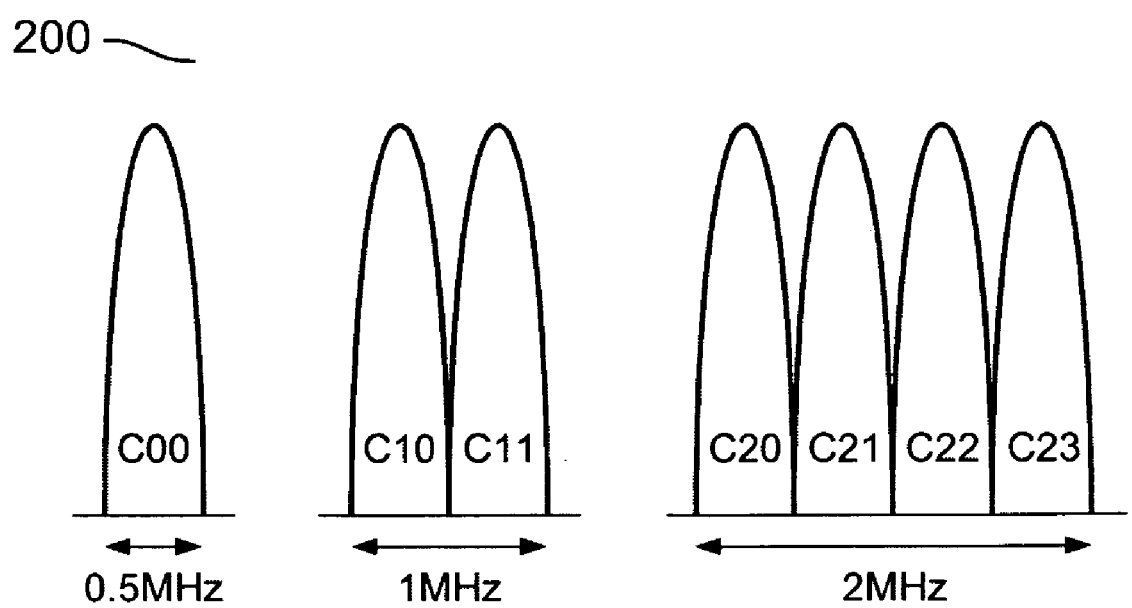
FIG. 2 illustrates a customer-premises-equipment (CPE) signal of 1-carrier, 2-carrier or 4-carrier.

FIG. 2 illustrates customer-premises-equipment (CPE) signals using 1-carrier, 2-carrier or 4-carrier sub-carrier sets. Since the bandwidth for each individual sub-carrier is also 500 kHz, the total bandwidth used is based on the number of sub-carriers involved. For example, in a 2-carrier case, the CPE signal has a bandwidth of 1 MHz. When an uplink bandwidth requirement increases, the CPE terminal can re-tune to a 4-carrier signal which occupies a bandwidth of 2 MHz.

A wireless broadband system operating in a certain licensed band must transmit all the signals within the band. A guard band is a small part of the radio spectrum in between radio bands, for the purpose of preventing interferences between two radio bands. If a CPE terminal operates near the band edge, it will be harder for the terminal to meet the out-of-band spurious emissions requirements due to the lack of a sufficient guard band. This will require the lowing of transmit power. On the other hand, if the terminal operates further away from the band edge, it will be easier for the terminal to meet the out-of-band spurious emissions requirements due to the added guard band.

So, as the terminal uplink bandwidth requirement increases, the BTS can move the wireless traffic assignment to carriers further away from the band-edge, in this way, the terminal does not have to lower its transmit power. The moving away from the band edge can be achieved by either shifting the frequency of the base band signal or re-tuning the RF carrier frequency.

Figure 3A:
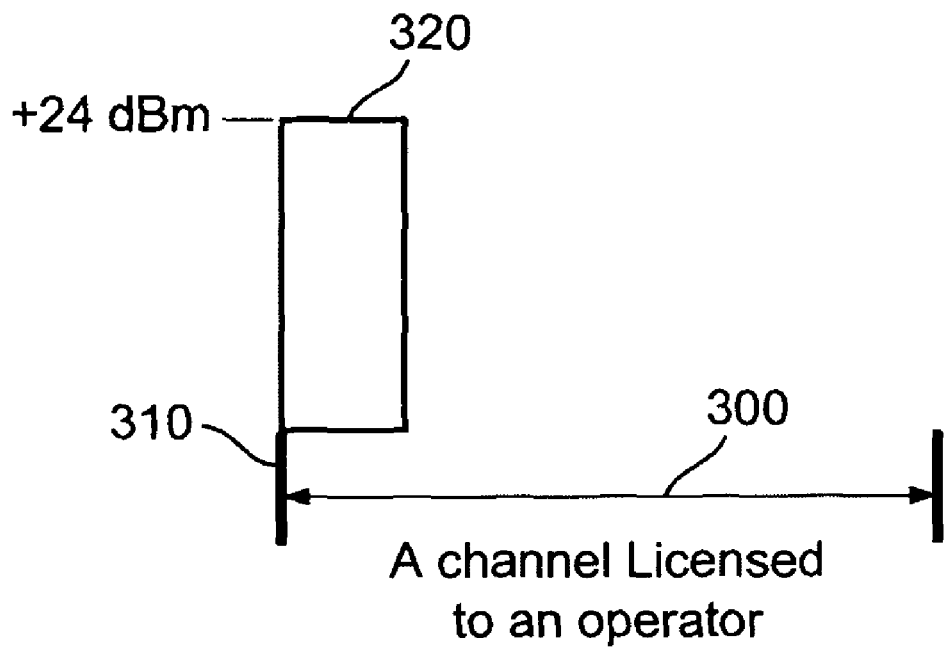
FIG. 3A illustrates a signal of a customer-premises-equipment (CPE) terminal transmitted at a band edge according to one embodiment of the present invention.

FIG. 3A illustrates a signal of a CPE terminal transmitted at a band edge 310 according to one embodiment of the present invention. Take a specific example, assuming the band 300 is a WCS band (2305-2360 MHz), and the signal is a 4-carrier signal. In order to meet the emission rules, the transmit power 320 of the signal is capped at +24 dBm due to its lack of guard band.

Figure 3B:
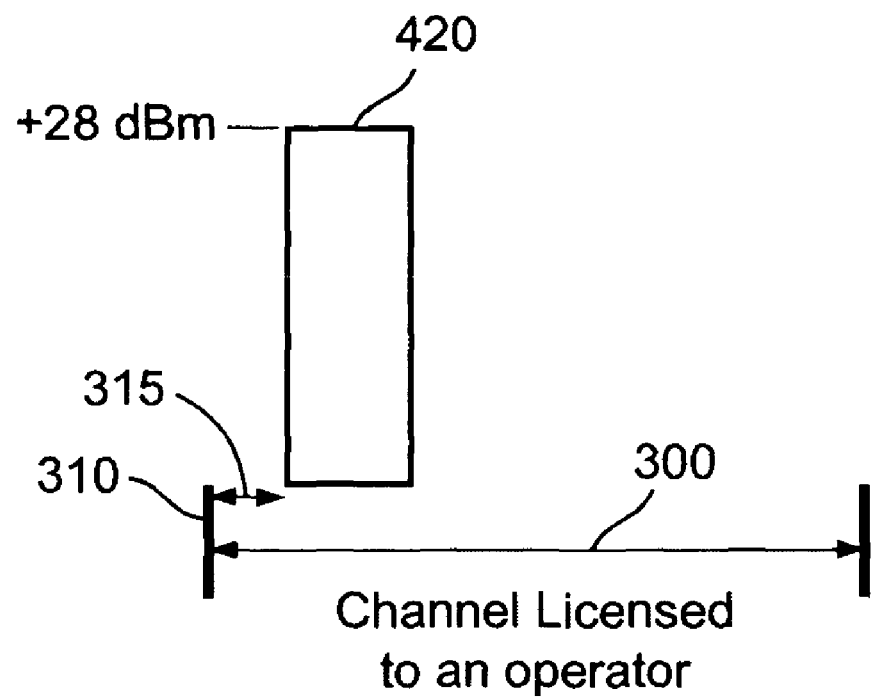
FIG. 3B illustrates a signal of a customer-premises-equipment (CPE) terminal transmitted away from a band edge according to one embodiment of the present invention.

FIG. 3B illustrates the same 4-carrier CPE signal is transmitted away from the band edge 310 by an amount of 1 MHz, for instance, then the cap of transmit power 420 can be raised to +28 dBm. The increase of the transmission power still meets the emission rules due to the added 1 MHz guard band 315.

Similarly, in a MMDS Band (2500-2686 MHz), the CPE terminal can transmit a +27 dBm signal of 4-carriers at band edge (0.25 MHz guard band) in a 5.5 MHz Channel that meets the Federal out-of-band spurious emissions requirements. However, with 1 MHz or more extra guard band from band edge, the CPE terminal can transmit the same 4-carrier signal at +30 dBm and still meet the Federal out-of-band spurious emissions requirements.

Figure 4:
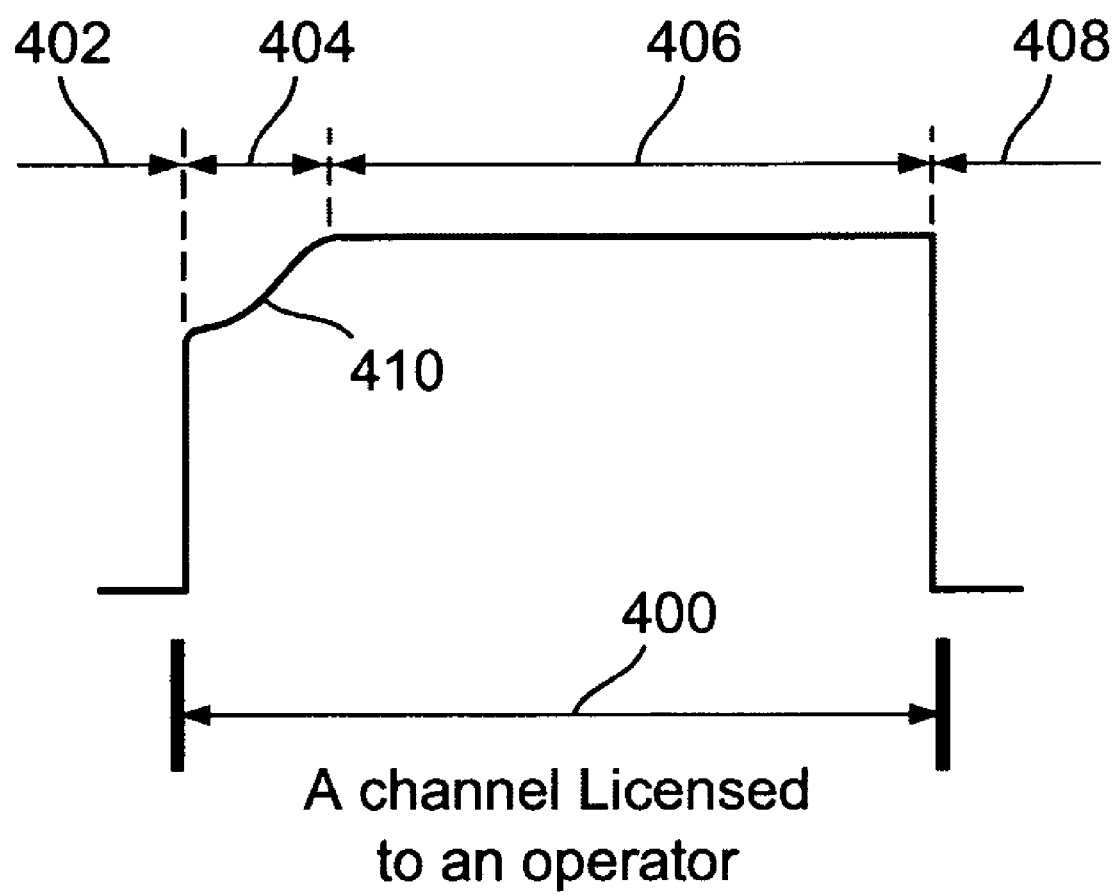
FIG. 4 illustrates an output power profile a customer-premises-equipment (CPE) terminal can operate according to another embodiment of the present invention.

FIG. 4 illustrates an output power profile 410 a CPE terminal can operate according to another embodiment of the present invention. The output power profile 410 is sent to the CPE terminal by a base station based on a band of frequencies, or a channel 400 the CPE terminal is operating in by a system operator. The power profile 410 indicates how the power should be managed over the predetermined frequency band including all the sub-carriers. A frequency spectrum 402 is not owned by the system operator, so the output power profile 410 in frequency spectrum 404 is reduced. On the other hand, a frequency spectrum 408 is owned by the same system operator, so in a frequency spectrum 406 which is up close to the spectrum 408, the output power profile is not restricted. So by providing the CPE an output power profile, the terminal's output power spectral density is controlled, and so are the out-of-band spurious emissions.

In a multi-carrier system, a CPE terminal is designed to have a capability to transmit one, two, or four sub-carriers at any assigned sub-carrier frequencies. The CPE terminal is also designed to have more than 60 dB power control range in 1 dB step size. With forward and reverse power controls, a base station (BTS) has a capability of detecting an approximate distance between a CPE terminal and the BTS.

With the capabilities to detect a terminal distance, the BTS can coordinate with the CPE terminal to manage its up-link transmit power. If the CPE terminal is close to the BTS, which means the CPE terminal does not need to transmit full power to communicate with the BTS, the system can assign sub-carriers that are near the band edge and caps the CPE transmit power at a lower maximum allowable power level, for instance, +24 dBm for a CPE terminal operates in the WCS band, and +27 dBm for a CPE terminal operates in the MMDS band.

For CPE terminals that are further away from the BTS, which means the CPE terminals may need to transmit full power to communicate with the BTS, the system can assign the sub-carriers that are 1 MHz or more away from the band edge and caps the CPE transmit power to a higher maximum allowable power level, for instance, +28 dBm for a WCS band CPE terminal, and +30 dBm for a MMDS CPE terminal.

For the far away terminals, the system can also assign a modulation that has low signal peak-to-mean ratio. Different modulations will have different signal peak-to-mean ratio. A signal with low peak-to-mean ratio will drive an output power amplifier less while the average output power remains the same. A less driven output power amplifier will generate less out-of-band emissions. So with lower peak-to-mean ratio, the average transmit power can be higher to meet the transmission requirement of the far away terminals.

With these methods, the up-link power of the wireless broadband terminal is managed without adding cost for a bigger linear power amplifier. The overall system capacity and link budget are also increased.

Although illustrative embodiments of this invention have been shown and described, other modifications, changes, and substitutions are intended. Accordingly, it is appropriate that the appended claims be construed broadly and in a manner consistent with the scope of the disclosure, as set forth in the following claims.

What is claimed is:

1. A method comprising:
   at a wireless terminal apparatus operating in a predetermined frequency band in a multi-carrier system, assigning a transmit signal to a first set of one or more sub-carriers;
   at the wireless terminal apparatus, transmitting the transmit signal at varying transmit power levels; and
   at the wireless terminal apparatus, reassigning the transmit signal from the first set of sub-carriers to a second set of one or more sub-carriers if the terminal operates close to a frequency band edge such that there is a lack of sufficient guard band at the frequency band edge, wherein the second set of sub-carriers is further away from the frequency band edge than the first set of sub-carriers such that there is a sufficient guard band at the frequency band edge with respect to the second set of sub-carriers.

2. The method of claim 1, further comprising modulating the transmit signal on the first set of sub-carriers with a signal peak-to-mean ratio smaller than that for the second set of sub-carriers.

3. The method of claim 1, wherein transmitting the transmit signal at varying transmit power levels further comprises generating a power profile that limits the power levels to a lower level for one or more sub-carriers close to the frequency band edge of the predetermined frequency band bordering another frequency band not used by the multi-carrier system.

4. The method of claim 1, further comprising lowering the transmit power levels if the transmit signal is close to the frequency band edge such that there is a lack of sufficient guard band at the frequency band edge.

5. The method of claim 4, further comprising modulating the transmit signal on the first set of sub-carriers with a signal peak-to-mean ratio smaller than that for the second set of sub-carriers.

6. The method of claim 4, wherein lowering the transmit power levels comprises generating a power profile that limits the power levels to a lower level for one or more sub-carriers close to the frequency band edge of the predetermined frequency band bordering another frequency band not used by the multi-carrier system.

7. The method of claim 1, further comprising determining a distance between the wireless terminal apparatus and a base transceiver station and adjusting the power levels based on the distance between the wireless terminal apparatus and the base transceiver station.

8. A method comprising:
at a base transceiver station apparatus in a multi-carrier system, receiving a transmit signal from a wireless terminal apparatus, wherein the transmit signal has varying power levels and comprises a first set of one or more sub-carriers in a predetermined frequency band; and
at the base transceiver station, reassigning the transmit signal to be transmitted by the wireless terminal apparatus from the first set of sub-carriers to a second-set of one or more sub-carriers if the transmit signal is close to a frequency band edge such that there is a lack of sufficient guard band at the frequency band edge, wherein the second set of sub-carriers is further away from the frequency band edge than the first set of sub-carriers such that there is a sufficient guard band at the frequency band edge with respect to the second set of sub-carriers.

9. The method of claim 8, further comprising lowering the power levels of the transmit signal when it is close to the frequency band edge such that there is a lack of sufficient guard band at the frequency band edge.

10. The method of claim 9, and further comprising modulating the transmit signal on the first set of sub-carriers with a signal peak-to-mean ratio smaller than that for the second set of sub-carriers.

11. The method of claim 10, wherein lowering the transmit power levels comprises generating a power profile that limits the power to a lower level for one or more sub-carriers close to the frequency band edge of the predetermined frequency band bordering another frequency band not used by the multi-carrier system.

12. The method of claim 8, further comprising modulating the transmit signal on the first set of sub-carriers with a signal peak-to-mean ratio smaller than that for the second set of sub-carriers.

13. The method of claim 8, wherein receiving the transmit signal at varying transmit power levels further comprises generating a power profile that limits the power levels to a lower level for one or more sub-carriers close to the frequency band edge of the predetermined frequency band bordering another frequency band not used by the multi-carrier system.

14. The method of claim 8, further comprising determining a distance between the wireless terminal apparatus and the base transceiver station and adjusting the power levels based on the distance between the wireless terminal apparatus and the base transceiver station.

15. A method comprising:
at a wireless terminal apparatus operating in a predetermined frequency band in a multi-carrier system, assigning a transmit signal to a first set of one or more sub-carriers;
at the wireless terminal apparatus, transmitting the transmit signal at varying transmit power levels;
at the wireless terminal apparatus, modulating the transmit signal on the first set of sub-carriers with a signal peak-to-mean ratio smaller than that for a second set of sub-carriers, the first set being closer to a frequency band edge of the predetermined frequency band than the second set of sub-carriers; and
at the wireless terminal apparatus, lowering the transmit power levels if the transmit signal is close to the frequency band edge such that there is a lack of sufficient guard band at the frequency band edge.

16. The method of claim 15, wherein lowering the transmit power levels comprises generating a power profile that limits the power level to a lower level for one or more sub-carriers close to the frequency band edge of the predetermined frequency band bordering another frequency band not used by the multi-carrier system.

17. A method comprising:
at a wireless terminal apparatus operating in a predetermined frequency band in a multi-carrier system, assigning a transmit signal to one or more sub-carriers; and
at the wireless terminal apparatus, modulating the transmit signal on a first set of sub-carriers with a signal peak-to-mean ratio smaller than that for a second set of sub-carriers, the first set of sub-carriers being closer to a frequency band edge of the predetermined frequency band than the second set of sub-carriers.

18. The method of claim 17, further comprising reassigning the transmit signal from the first set of sub-carriers to the second set of sub-carriers if the terminal operates close to the frequency band edge such that there is a lack of sufficient guard band at the frequency band edge, wherein the second set of sub-carriers is further away from the frequency band edge than the first set of sub-carriers such that there is a sufficient guard band at the frequency band edge with respect to the second set of sub-carriers.

19. The method of claim 17, further comprising lowering power levels of the transmit signal when it is close to the frequency band edge such that there is a lack of sufficient guard band at the frequency band edge.

* * * * *